(12) United States Patent
Haase et al.

(10) Patent No.: US 9,207,881 B1
(45) Date of Patent: Dec. 8, 2015

(54) SYSTEM AND METHOD FOR OBJECT MANAGEMENT

(71) Applicant: EMC Corporation, Hopkinton, MA (US)

(72) Inventors: David Haase, Fuquay Varina, NC (US); Miles A. de Forest, Bahama, NC (US); Paul Thomas McGrath, Raleigh, NC (US); Dayanand Suldhal, New Canaan, CT (US); Nagapraveen Veeravenkata Seela, Cary, NC (US); Robert F. Goudreau, Jr., Cary, NC (US); Michael Christopher Brundage, Lexington, SC (US)

(73) Assignee: EMC Corporation, Hopkinton, MA (US)

( * ) Notice: Subject to any disclaimer, the term of this patent is extended or adjusted under 35 U.S.C. 154(b) by 327 days.

(21) Appl. No.: 13/649,659

(22) Filed: Oct. 11, 2012

(51) Int. Cl.
*G06F 9/455* (2006.01)
*G06F 3/06* (2006.01)

(52) U.S. Cl.
CPC .................................... *G06F 3/0689* (2013.01)

(58) Field of Classification Search
None
See application file for complete search history.

(56) References Cited

U.S. PATENT DOCUMENTS

| 7,062,628 | B2 * | 6/2006 | Amano | 711/170 |
| 8,078,905 | B1 * | 12/2011 | Vipul et al. | 714/6.1 |
| 2002/0120886 | A1 * | 8/2002 | Nguyen et al. | 714/39 |
| 2008/0059732 | A1 * | 3/2008 | Okada et al. | 711/162 |

* cited by examiner

*Primary Examiner* — Sisley Kim
(74) *Attorney, Agent, or Firm* — Brian J. Colandreo; Mark H. Whittenberger; Holland & Knight LLP

(57) ABSTRACT

A method, computer program product, and computing system for defining a first virtual object, wherein the first virtual object includes a first ready state indicator. At least a second virtual object is defined, wherein the at least a second virtual object includes at least a second ready state indicator. The first virtual object and the at least a second virtual object are grouped within a group virtual object.

15 Claims, 3 Drawing Sheets

SYSTEM AND METHOD FOR OBJECT MANAGEMENT

TECHNICAL FIELD

This disclosure relates to object management and, more particularly, to virtual object management.

BACKGROUND

Storing and safeguarding electronic content is of paramount importance in modern business. Accordingly, various systems may be employed to protect such electronic content.

The use of high-availability data arrays is increasing in popularity, wherein each data array may be configured to serve a plurality of hosts (e.g., servers). Typically, data arrays are apportioned into a plurality of LUNs (i.e., logical drives) that are accessed by and/or assigned to hosts. Unfortunately, certain applications may require the use of multiple LUNs, each of which may need to be administered separately.

SUMMARY OF DISCLOSURE

In one implementation, a computer-implemented method includes defining a first virtual object, wherein the first virtual object includes a first ready state indicator. At least a second virtual object is defined, wherein the at least a second virtual object includes at least a second ready state indicator. The first virtual object and the at least a second virtual object are grouped within a group virtual object.

One or more of the following may be included. A status for the group virtual object may be determined based, at least in part, upon the first ready state indicator and the at least a second ready state indicator. The status for the group virtual object may be communicated to one or more users of the group virtual object. One or more tasks to be executed on at least one of the first virtual object and the at least a second virtual object may be automated. The one or more tasks may be chosen from the group consisting of: combining one or more LUNs; backing up one or more LUNs; restoring one or more LUNs; and taking a snapshot of one or more LUNs. At least one of the first virtual object and the at least a second virtual object may include a LUN. At least one of the first virtual object and the at least a second virtual object may be configured as a state machine.

In another implementation, a computer program product resides on a computer readable medium that has a plurality of instructions stored on it. When executed by a processor, the instructions cause the processor to perform operations including defining a first virtual object, wherein the first virtual object includes a first ready state indicator. At least a second virtual object is defined, wherein the at least a second virtual object includes at least a second ready state indicator. The first virtual object and the at least a second virtual object are grouped within a group virtual object.

One or more of the following may be included. A status for the group virtual object may be determined based, at least in part, upon the first ready state indicator and the at least a second ready state indicator. The status for the group virtual object may be communicated to one or more users of the group virtual object. One or more tasks to be executed on at least one of the first virtual object and the at least a second virtual object may be automated. The one or more tasks may be chosen from the group consisting of: combining one or more LUNs; backing up one or more LUNs; restoring one or more LUNs; and taking a snapshot of one or more LUNs. At least one of the first virtual object and the at least a second virtual object may include a LUN. At least one of the first virtual object and the at least a second virtual object may be configured as a state machine.

In another implementation, a computing system includes at least one processor and at least one memory architecture coupled with the at least one processor, wherein the computing system is configured to perform operations including defining a first virtual object, wherein the first virtual object includes a first ready state indicator. At least a second virtual object is defined, wherein the at least a second virtual object includes at least a second ready state indicator. The first virtual object and the at least a second virtual object are grouped within a group virtual object.

One or more of the following may be included. A status for the group virtual object may be determined based, at least in part, upon the first ready state indicator and the at least a second ready state indicator. The status for the group virtual object may be communicated to one or more users of the group virtual object. One or more tasks to be executed on at least one of the first virtual object and the at least a second virtual object may be automated. The one or more tasks may be chosen from the group consisting of: combining one or more LUNs; backing up one or more LUNs; restoring one or more LUNs; and taking a snapshot of one or more LUNs. At least one of the first virtual object and the at least a second virtual object may include a LUN. At least one of the first virtual object and the at least a second virtual object may be configured as a state machine.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
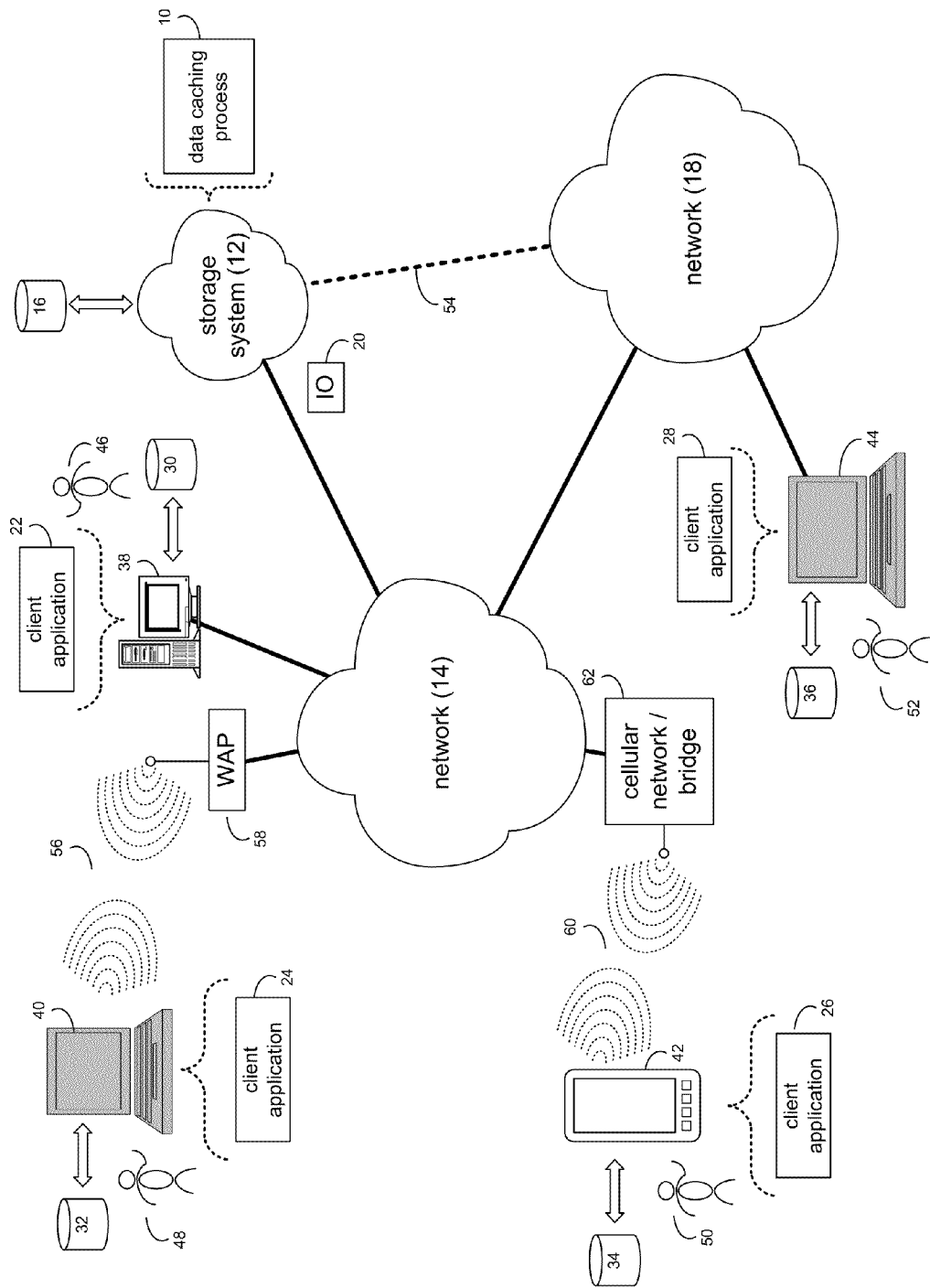
FIG. 1 is a diagrammatic view of a storage system and an object management process coupled to a distributed computing network.

System Overview:

Referring to FIG. 1, there is shown object management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of object management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
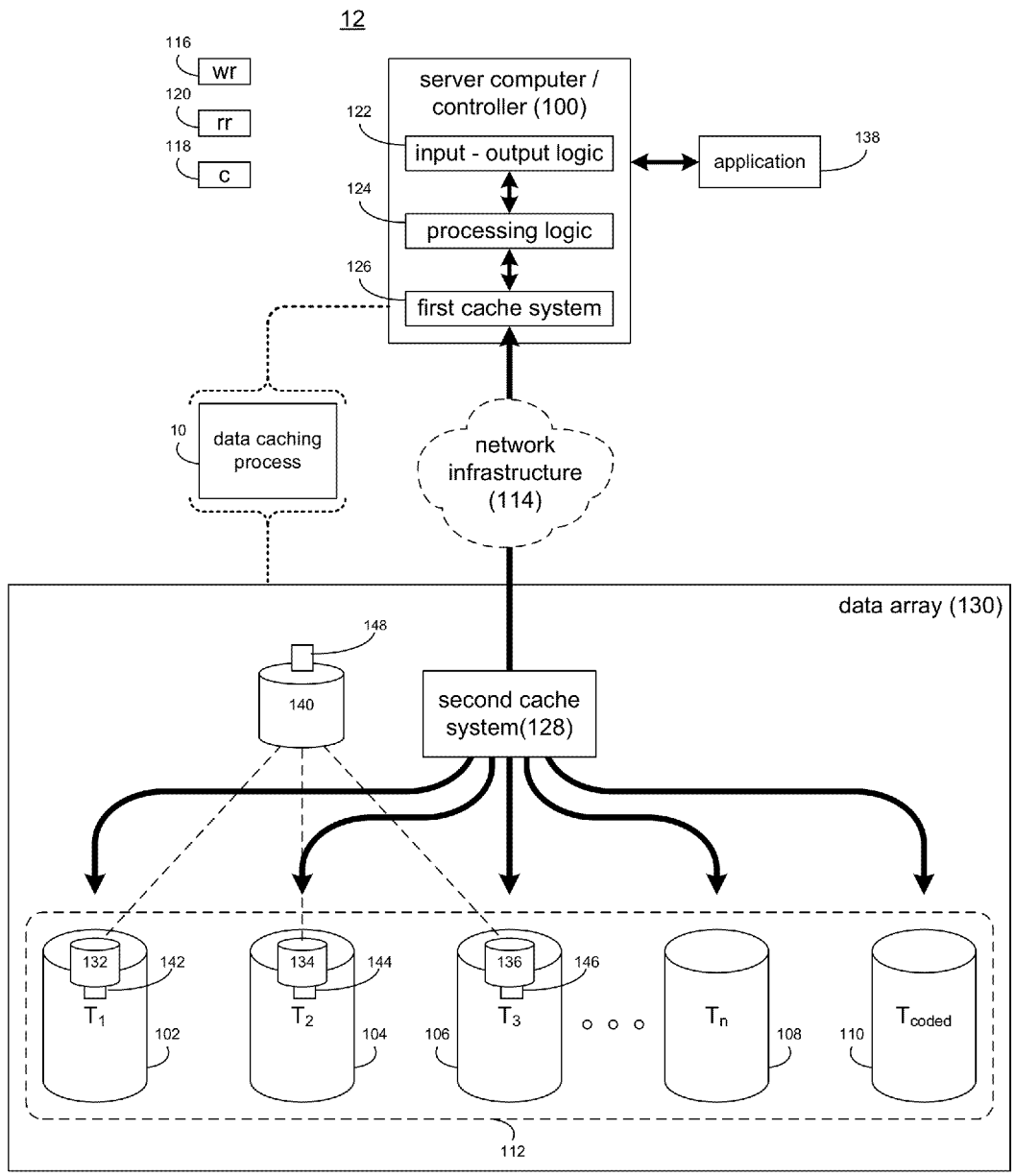
FIG. 2 is a diagrammatic view of the storage system of FIG. 1.
Figure 3:
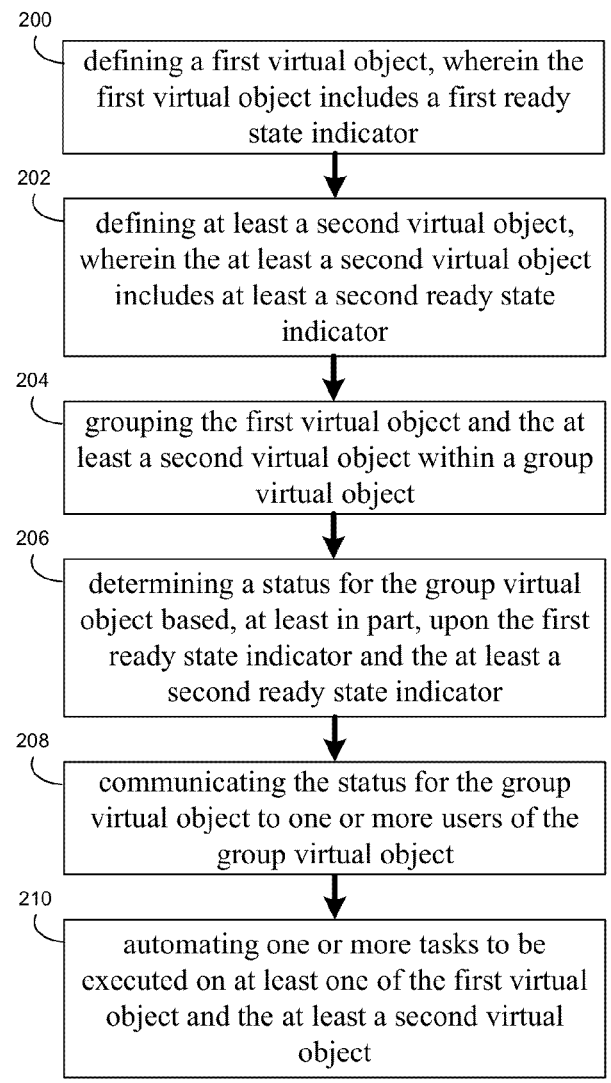
FIG. 3 is a flow chart of one implementation of the object management process of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of object management process 10. The instruction sets and subroutines of object management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electromechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of object management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of object management process 10 may be executed by one or more processors (not shown) and one or more memory architectures (not shown) included within data array 130.

The Object Management Process:

As discussed above, data arrays (e.g., data array 130) may be apportioned into a plurality of LUNs (i.e., logical drives) that may be accessed by and/or assigned to hosts (e.g., server computer/controller 100). For example, data array 130 may include (in this example) three LUNs, namely LUNs 132, 134, 136. In this particular example, LUNs 132, 134, 136 are shown to be included within storage targets 102, 104, 106 (respectively). However, the quantity of LUNs and the location of each LUN (with respect to storage targets) as shown in this example is for illustrative purposes only and is not intended to be a limitation of this disclosure. Specifically, the quantity of LUNs may be increased or decreased on an as needed basis, as may the locations of the individual LUNs within data array 130.

As discussed above, server computer/controller 100 may be configured as an application server. Accordingly, server computer/controller 100 may execute one or more applications (e.g., application 138). An example of application 138 may include a database application (such as Oracle™), wherein the various associated database files (e.g., database record files, temporary files, index files, and log files) may be stored on data array 130.

For various reasons, it may not be desirable/possible/practical to store the above-described files (e.g., database record files, temporary files, index files, and log files) on a single LUN. Accordingly, multiple LUNs may need to be used to store e.g., the database record files, the temporary files, the index files, and the log files.

Assume for illustrative purposes that LUN 132 may be used to store the database record files, LUN 134 may be used to store the temporary files, and LUN 136 may be used to store the index files and the log files. Accordingly, the files required for the operation of application 138 may be distributed across LUNs 132, 134, 136.

Unfortunately, virtual objects (such as LUNs 132, 134, 136) may be subject to certain routine maintenance/administrative tasks. For example, virtual objects may need to be started up, shut down, backed up and/or restored. Accordingly, object management process 10 may be configured to allow for "batch" processing and control of a plurality of virtual objects.

For example, object management process 10 may be configured to define 200 a first virtual object (e.g., LUN 132) for inclusion within a group virtual object (e.g., group virtual object 140). First virtual object (e.g., LUN 132) may be configured to include a first ready state indicator (e.g., ready state indicator 142).

Object management process 10 may be configured to define 202 at least a second virtual object (e.g., LUNs 134, 136) for inclusion within the group virtual object (e.g., group virtual object 140). These virtual objects (e.g., LUNs 134, 136) may be configured to include ready state indicators (e.g., ready state indicators 144, 146).

Once defined 200, 202, object management process 10 may group 204 these virtual objects (e.g., LUNs 132, 134, 136) within group virtual object 140. Once properly configured, group virtual object 140 may allow for automated "batch-type" processing of various tasks performed with respect to the virtual objects (e.g., LUNs 132, 134, 136) included within group virtual object 140. As will be discussed below in greater detail, examples of such tasks may include but are not limited to: combining one or more LUNs; backing up one or more LUNs; restoring one or more LUNs; and taking a snapshot of one or more LUNs.

Once properly configured, group virtual object 140 may act as a consolidated status reporting conduit for all of the virtual objects (e.g., LUNs 132, 134, 136) included within group virtual object 140. As discussed above, each of the virtual objects (e.g., LUNs 132, 134, 136) included within group virtual object 140 may include a ready state indicator (e.g., ready state indicators 142, 144, 146 respectively). Additionally, group virtual object 140 may be configured to include a group ready state indicator (e.g., group ready state indicator 148) that may identify the status of group virtual object 140.

Object management process 10 may determine 206 a status for group virtual object 140 (based, at least in part, upon ready state indicators 142, 144, 146) that may be stored within e.g., group ready state indicator 148. Object management process 10 may be configured to communicate 208 the status for group virtual object 140 to one or more users (e.g. users 46, 48, 50, 52 and/or application 132) of group virtual object 140.

For example, group ready state indicator 148 may be readable by e.g. users 46, 48, 50, 52 and/or application 132, thus allowing e.g. users 46, 48, 50, 52 and/or application 132 to determine the status of group virtual object 140. Alternatively, the status of group virtual object 140 may be broadcast/provided to e.g. users 46, 48, 50, 52 and/or application 132.

As discussed above, when object management process 10 determines 206 a status for group virtual object 140, the status (e.g. which may be stored within e.g., group ready state indicator 148) may be based, at least in part, upon ready state indicators 142, 144, 146. Accordingly, prior to defining the status of group virtual object 140 as being "ready", each and every virtual object (e.g., LUNs 132, 134, 136) included within group virtual object 140 may need to be defined as "ready". Specifically and in this particular example, object management process 10 is grouping a plurality of virtual objects (e.g., LUNs 132, 134, 136) to form, in this example, a "super" LUN that has the combined capacity of LUNs 132, 134, 136 and may appear as a single addressable space to the users and applications accessing group virtual object 140. Accordingly, in order for group virtual object 140 to be defined as "ready", each of LUNs 132, 134, 136 must also be defined as "ready".

The virtual objects (e.g., LUNs 132, 134, 136) included within group virtual object 140 may be configured as a state machine. As is known in the art, a state machine is a mathematical representation of a system that has a finite number of states. For example and with respect to LUNs 132, 134, 136, a state machine may only be in one state at a time and transitioning from a first state to a second state typically requires the occurrence of a trigger event. States for LUNs 132, 134, 136 may include e.g., "offline", "booting", "ready", and "faulted".

Object management process 10 may be configured to automate 210 one or more tasks to be executed on the virtual objects (e.g., LUNs 132, 134, 136) included within group virtual object 140. For example, the process of combining one or more LUNs (e.g., LUNs 132, 134, 136) to form group virtual object 140 may be automated 210 by object management process 10. Accordingly, in the event that the needs of application 138 change (e.g., they increase), object management process 10 may be configured (in the manner discussed above) to add one or more additional LUNs to group virtual object 140. Conversely and in the event that the needs of application 138 decrease, object management process 10 may be configured to remove one or more LUNs from group virtual object 140.

Further, object management process 10 may be configured to automate 210 the process of backing up the LUNs (e.g., LUNs 132, 134, 136) included within group virtual object 140. Specifically and without object management process 10, in order to back up e.g., LUNs 132, 134, 136, a separate backup procedure would need to be executed for each of the LUNs (e.g., LUNs 132, 134, 136) included within group virtual object 140. However, by automating the backup process, object management process 10 may allow for a single backup procedure to be effectuated that would result in the backing up of e.g., LUNs 132, 134, 136. Specifically, object management process 10 may still effectuate the execution of the plurality of distinct backup procedures (namely one for each of e.g., LUNs 132, 134, 136). However, by automating such a process, object management process 10 may allow for such a backup procedure to be executed simply.

Additionally, object management process 10 may be configured to automate 210 the process of restoring one or more LUNs (e.g., LUNs 132, 134, 136). Therefore, in the event that a failure occurs and the condition/validity of the data included within group virtual object 140 is compromised, object management process 10 may automate the procedure of utilizing the appropriate backup file (not shown) to restore each of e.g., LUNs 132, 134, 136 to their "pre failure" condition.

Further, object management process 10 may be configured to automate 210 the process of generating "snapshot" of the data included within group virtual object 140. Specifically and as is known in the art, a "snapshot" of a data structure is a temporal copy of the data included within the data structure. Accordingly, cache management process 10 may be configured to take a "snapshot" of the LUNs (e.g., LUNs 132, 134, 136) included within group virtual object 140 every defined period of time (e.g. every hour, every day, every week, or every month). Such "snapshots" may be stored for later use to e.g. restore files accidentally deleted and/or recover from a hardware failure.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/ special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   defining a first virtual object included within a first storage target within a backend data array, wherein the first virtual object includes a first ready state indicator and a LUN;
   defining at least a second virtual object included within at least a second storage target within the backend data array, wherein the second virtual object includes at least a second ready state indicator, wherein the first virtual object and the second virtual object are configured as one or more state machines;
   grouping the first virtual object and the second virtual object within a group virtual object to allow for batch processing and control of the first virtual object and at least the second virtual object, and
   determining, in response to the grouping, a status for the group virtual object based upon the first ready state indicator, the second ready state indicator and a group ready state indicator, wherein the group ready state indicator is configured to allow a user or application to determine the status for the group virtual object.

2. The computer-implemented method of claim 1 further comprising:
   communicating the status for the group virtual object to one or more users of the group virtual object.

3. The computer-implemented method of claim 1 further comprising:
   automating one or more tasks to be executed on at least one of the first virtual object and the at least a second virtual object.

4. The computer-implemented method of claim 1 wherein the one or more tasks are chosen from the group consisting of:
   combining one or more LUNs;
   backing up one or more LUNs;
   restoring one or more LUNs; and
   taking a snapshot of one or more LUNs.

5. The computer-implemented method of claim 1 wherein at least one of the first virtual object and the at least a second virtual object includes a LUN.

6. A computer program product residing on a non-transitory computer readable medium having a plurality of instructions stored thereon which, when executed by a processor, cause the processor to perform operations comprising:
   defining a first virtual object included within a first storage target within a backend data array, wherein the first virtual object includes a first ready state indicator and a LUN;
   defining at least a second virtual object included within at least a second storage target within the backend data array, wherein the second virtual object includes at least a second ready state indicator, wherein the first virtual object and the second virtual object are configured as one or more state machines;
   grouping the first virtual object and the second virtual object within a group virtual object to allow for batch processing and control of the first virtual object and at least the second virtual object, and
   determining, in response to the grouping, a status for the group virtual object based upon the first ready state indicator, the second ready state indicator and a group ready state indicator, wherein the group ready state indicator is configured to allow a user or application to determine the status for the group virtual object.

7. The computer program product of claim 6 further comprising instructions for:
   communicating the status for the group virtual object to one or more users of the group virtual object.

8. The computer program product of claim 6 further comprising instructions for:
   automating one or more tasks to be executed on at least one of the first virtual object and the at least a second virtual object.

9. The computer program product of claim 6 wherein the one or more tasks are chosen from the group consisting of:
   combining one or more LUNs;
   backing up one or more LUNs;
   restoring one or more LUNs; and
   taking a snapshot of one or more LUNs.

10. The computer program product of claim 6 wherein at least one of the first virtual object and the at least a second virtual object includes a LUN.

11. A computing system including at least one processor and at least one memory architecture coupled with the at least one processor, wherein the computing system is configured to perform operations comprising:
    defining a first virtual object included within a first storage target within a backend data array, wherein the first virtual object includes a first ready state indicator and a LUN;
    defining at least a second virtual object included within at least a second storage target within the backend data array, wherein the second virtual object includes at least a second ready state indicator, wherein the first virtual object and the second virtual object are configured as one or more state machines;
    grouping the first virtual object and the second virtual object within a group virtual object to allow for batch processing and control of the first virtual object and at least the second virtual object, and
    determining, in response to the grouping, a status for the group virtual object based upon the first ready state indicator, the second ready state indicator and a group ready state indicator, wherein the group ready state indicator is configured to allow a user or application to determine the status for the group virtual object.

12. The computing system of claim 11 further configured to perform operations comprising:
    communicating the status for the group virtual object to one or more users of the group virtual object.

13. The computing system of claim 11 further configured to perform operations comprising:
    automating one or more tasks to be executed on at least one of the first virtual object and the at least a second virtual object.

14. The computing system of claim 11 wherein the one or more tasks are chosen from the group consisting of:
    combining one or more LUNs;
    backing up one or more LUNs;
    restoring one or more LUNs; and
    taking a snapshot of one or more LUNs.

15. The computing system of claim 11 wherein at least one of the first virtual object and the at least a second virtual object includes a LUN.

* * * * *